Figure 1:
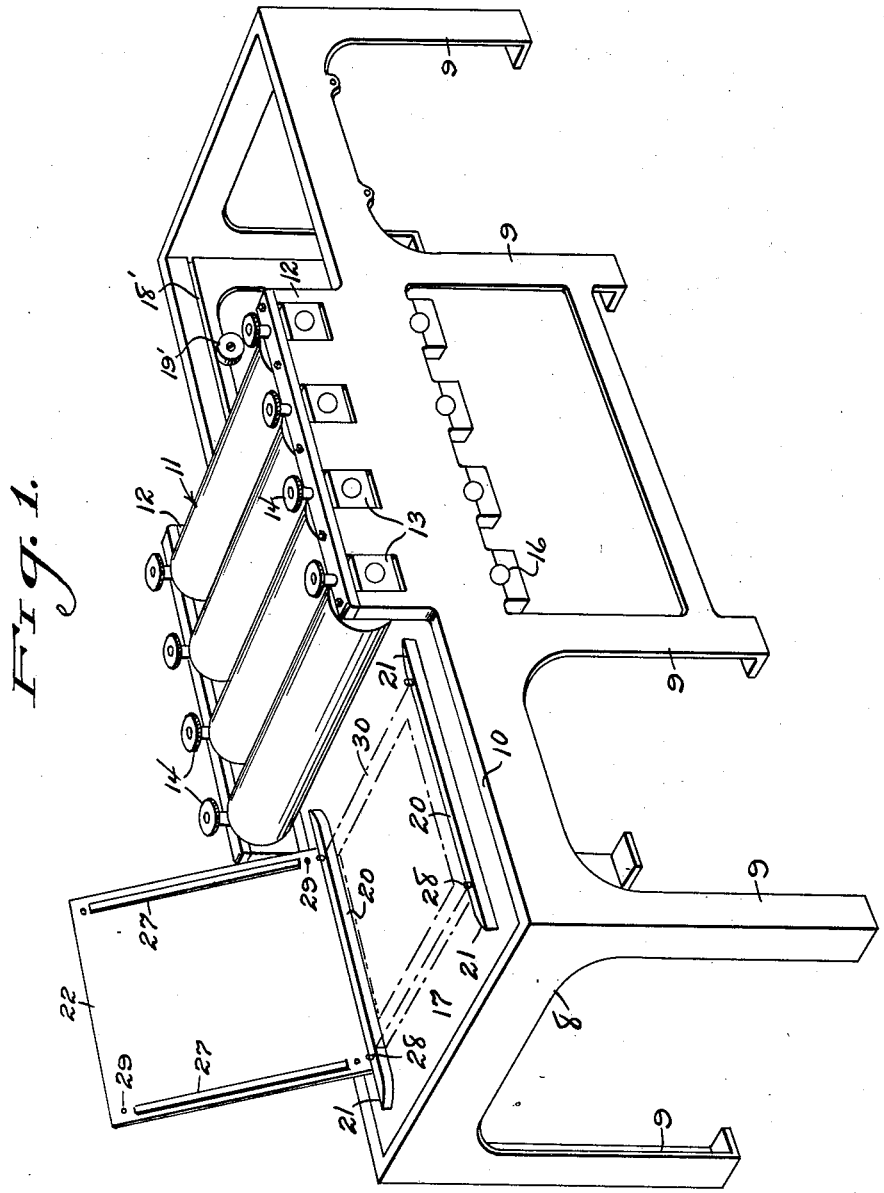

Oct. 19, 1937.　　　　E. A. MILLS　　　　2,096,643
DIRECT PRESSURE MATRIX MOLDER
Filed Aug. 12, 1936　　　3 Sheets-Sheet 1

Edgar A. Mills
INVENTOR
BY Victor J. Evans & Co.
ATTORNEYS

Oct. 19, 1937.  E. A. MILLS  2,096,643
DIRECT PRESSURE MATRIX MOLDER
Filed Aug. 12, 1936  3 Sheets-Sheet 2
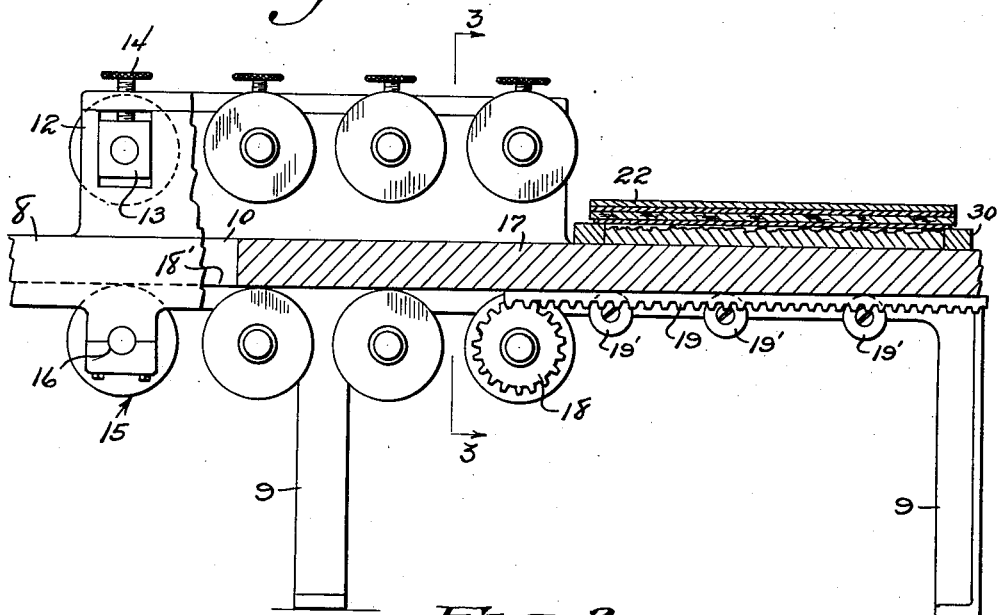
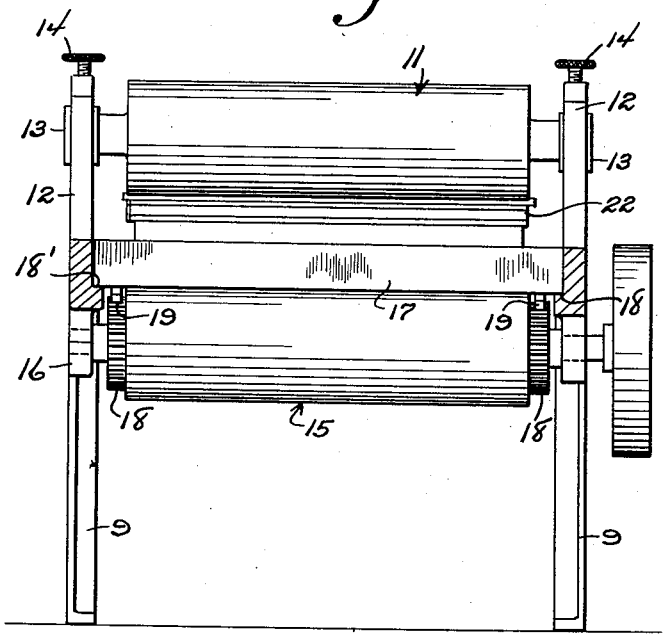

Oct. 19, 1937.  E. A. MILLS  2,096,643
DIRECT PRESSURE MATRIX MOLDER
Filed Aug. 12, 1936   3 Sheets-Sheet 3
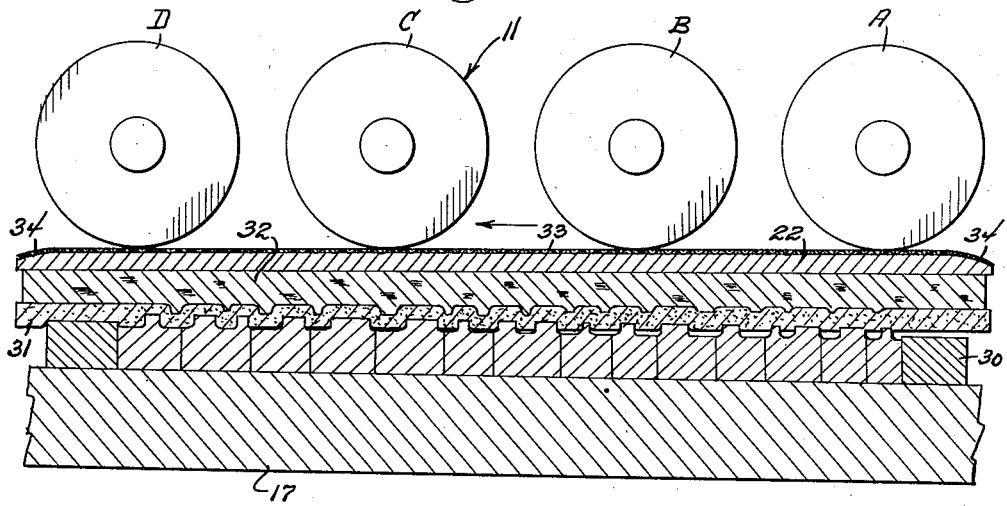
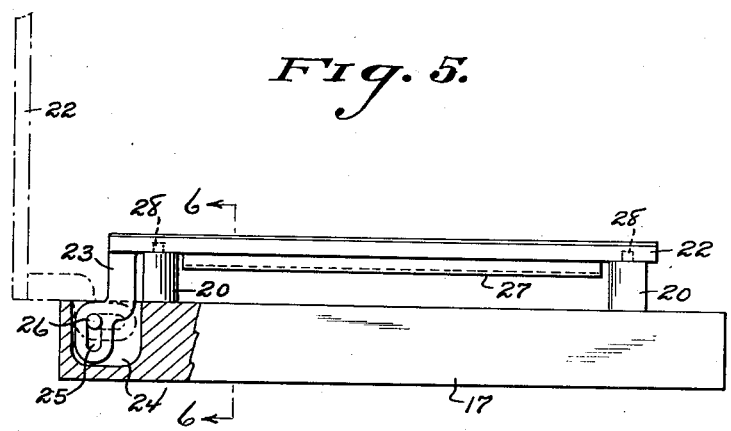
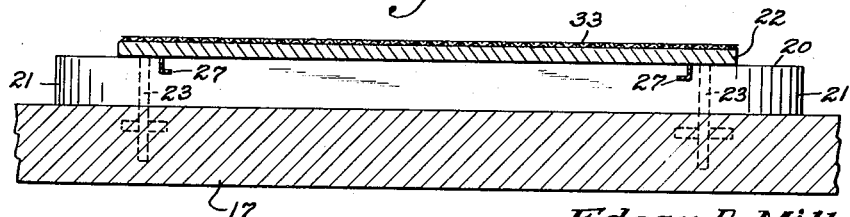
Edgar A. Mills
INVENTOR
BY Victor J. Evans & Co.
ATTORNEYS Patented Oct. 19, 1937

2,096,643

UNITED STATES PATENT OFFICE 2,096,643

DIRECT PRESSURE MATRIX MOLDER

Edgar A. Mills, New York, N. Y.

Application August 12, 1936, Serial No. 95,669

10 Claims. (Cl. 101—12)

The present invention relates to a new and improved direct pressure matrix molder.

The primary object of the invention is to provide a matrix molding machine constructed for molding a matrix by direct pressure using a series of heavy pressure rollers which individually contact the matrix form as it travels under the rollers.

A further object of the invention is to provide a direct pressure matrix molder comprising a series of pressure rollers with means for varying the pressure of each roller whereby, as the matrix and form materials pass beneath the rollers, a varied impression will be given.

A still further object of the invention is to provide in a direct pressure matrix molder including a series of varied pressure rollers, a metallic plate to receive the impression of the rollers and transfer that impression to the matrix.

The invention will be fully and comprehensively understood from a consideration of the following detailed description when read in connection with the accompanying drawings which form part of the application.

In the drawings:

Figure 1 is a perspective view of a molding machine constructed in accordance with the present invention, Figure 2 is a fragmentary sectional view of the device illustrated in Figure 1 with parts in elevation, Figure 3 is a sectional view taken on line 3—3 of Figure 2, Figure 4 is a transverse sectional view and illustrating a matrix being molded in the machine, Figure 5 is an end elevational view of the supporting table and illustrating in section the means for detachable hinging of the metallic molding plate, and Figure 6 is a sectional view taken on line 6—6 of Figure 5.

At the present time there is in use for certain types of printing work a machine for molding a stereotype matrix which comprises a platen on which the matrix and form materials are positioned to receive an impression from a hydraulic operated press. This type of machine is especially used for color work in magazine and newspaper printing.

The present invention uses a series of rollers set in a frame and each roller controlled as to the amount of pressure. Two or more rollers are to be used, although any desired number of rollers may be positioned in the frame without departing from the spirit of the invention. Each roller may be adjusted to cause an equal amount of pressure, if desired, although it is preferable that each roller be set at a different pressure so as to increase the pressure on the molded mat as it passes through the machine. A metal molding plate will be positioned over the form and on top of the mat and blankets and contact of the metal plate with the rollers causes a rotation thereof since said rollers are preferably floating in their journals. While said rollers are preferably floating in their journals, a means may be provided in the form of gears for emergency use and a means will be provided for operating the gears to cause rotation of the rollers.

Referring to the drawings for a more detailed description thereof, the device includes a frame 8 supported on legs 9 and having a support 10 supporting a table which travels beneath the series of rollers 11 during the molding of a matrix. The series of rollers 11 are journalled in the upstanding portion 12 and the ends thereof are free to rotate in bearings 13. The shaft of each roller carries at each end thereof a screw 14 for adjusting the pressure of the roller and, if desired, a suitable gauge may be provided for indicating the specific pressure of each roller.

Positioned beneath the frame 8 and directly opposite the rollers 11 are a second set of rollers 15 which are journalled at 16 and over which the bed supporting the chase and form materials passes during the molding of the matrix. If desired, the lower set of rollers 15 may be smaller in diameter than the upper set of rollers 11. The supporting table is indicated by the numeral 17 and said table is driven through the gear 18 carried by one or more of the lower rollers, and the rack 19 carried by the table 17. Any desired means may be used for driving the roller carrying the gear 18. The table 17 is supported on the track 18' and a series of rollers 19' are provided for facilitating the movement of the table.

A pair of guides 20 are attached to the table 17 and are adapted to support the chase and form materials over which the matrix to be molded is positioned. The ends 21 of the guides 20 are preferably curved to facilitate and expedite the positioning of the chase and other form materials. The metallic plate 22 is secured to the table 17 by means of the detachable goose-neck hinge 23 supported in the recess 24 of said table, as shown in Figure 5 of the drawings. The hinge 23 includes an elongated slot 25 for movement around the pin 26 and the position of the metal plate when raised is illustrated in dot and dash lines in Figure 5 of the drawings. It will be noted that the arm of the hinge 23 rests upon the edge of the table 17 and that the position of the slotted end has changed. The recess 24 is sufficiently large to permit free movement of the slotted end of the hinge. The plate 22 is also provided with channel strips 27, suitably spaced to retain therein a cork or the like blanket used in matrix molding together with the matrix. The guides 20 are provided with upstanding pins 28 adapted to fit within corresponding openings 29 in the plate 22 when said plate is in closed position for molding a matrix. The pins 28 are provided to prevent longitudinal movement of the plate while passing through the pressure rollers.

As is customary in matrix molding, the type from which the impression is to be taken is placed in a chase or form 30 and said chase is then positioned on the table. The matrix to be molded indicated by the numeral 31, may be placed over the chase and form materials or positioned in the channels 27 of the metallic plate 28. When positioning the matrix in the channels 27, a blanket 32 of cork or the like is first positioned in said channels and is retained therein together with the matrix 31. After positioning the blanket and matrix within the metal plate 22, said plate is lowered and the pins 28 are received in the openings 29. The means for driving the gear carrying roller is then operated and the table supporting the chase, matrix, blanket and metal plate travels forward in the direction of the arrows indicated in Figures 1 and 4, between the sets of rollers. In Figure 4 there is illustrated a matrix receiving its impression and it will be noted that the forward end of the matrix has received a deeper impression than the rear end. This is due to the fact that the forward end of the table has traveled beneath the entire set of rollers. As the table passes between the rollers, a slight impression is imparted to the matrix from the roller "A". Continued movement of the table results in an increased pressure from rollers "B", "C", and "D" respectively, and the roller "D" will impart to the matrix the maximum pressure. During the travel of the table between the sets of rollers, the matrix will receive a single impression since the weight of the metallic blanket 22 will maintain the matrix in constant contact with the chase and form during the entire molding operation thereby preventing a movement of the matrix which might create a double impression.

In order to prevent injury of the rollers by direct contact with the metal plate there is provided a blanket 33 of canvas or other fabric material positioned between the rollers and said plate. It is understood that one or all of the rollers may be floating in their journals and thereby rotate by contact with the form as it travels beneath said rollers. The metal plate 22 has its ends preferably bevelled as indicated at 34 to further prevent injury to the rollers as it travels through the machine.

In the operation of the herein described device for molding a stereotype matrix, the chase supporting the type and form materials is supported on the table between the guides 20. After positioning the chase, a cork or the like blanket is placed into the channel 27 of the metal plate 22 and the matrix to be molded is then positioned in the channel with the back thereof against the cork blanket so that when the metal plate is lowered, the face of the matrix will contact the type. The machine is started and the table supporting the chase and matrix is caused to travel toward the rollers. As the table travels beneath the rollers, the contact of the metal plate through the blanket 33 causes the rollers to revolve and at the same time exert a downward pressure on the matrix, the matrix receiving the pressure through the metal plate. The first roller contacting the plate will be of sufficient pressure to slightly set the imprint of the type into the face of the matrix so that said matrix cannot slip or stretch and will be securely held for the succeeding roller of greater pressure than the first roller. The third and fourth rollers in turn exert a greater pressure and the fourth or final roller exerts the maximum amount of pressure. After the molded matrix has traveled from beneath the last roller, the molded form will still retain the mat and blankets together with the metal plate, thereby keeping the matrix flat and in proper condition until removed. A suitable means will be provided for returning the movable table to its original or starting position for re-use.

It is to be understood that suitable means will also be provided for preventing the operation of the device while the metallic plate is in an upright position and due to the weight of said plate a means will also be provided to assist in the raising and lowering of the same.

It is to be understood that this improvement is capable of extended application and is not confined to the exact showing of the drawings nor to the precise construction described, and therefore, such changes and modifications may be made therein as do not affect the spirit of the invention nor exceed the scope thereof as expressed in the appended claims.

I claim:—

1. A matrix molding machine of the character described comprising a supporting bed, means for causing longitudinal movement of said bed, a series of rollers positioned above and below said bed, the upper series of rollers rotating freely in journals and adapted to exert a varied downward pressure, means for supporting a chase containing type and form materials and a metallic plate for positioning over said chase and adapted to contact the upper series of rollers during movement of the bed.

2. A matrix molding machine of the character described comprising a supporting bed, means for causing longitudinal movement of said bed, a series of rollers positioned above and below said bed, the upper series of rollers rotating freely in journals and adapted to exert a varied downward pressure, means for adjusting the pressure of said rollers, means on said bed for guiding and supporting a chase containing type and form materials, a metallic plate hinged to said bed and adapted to be positioned over said chase and means for retaining said plate over said chase.

3. A matrix molding machine of the character described comprising a supporting bed, means for causing longitudinal movement of said bed, a series of rollers positioned above and below said bed, the upper series of rollers rotating freely in journals and adapted to exert a varied downward pressure, means for adjusting the pressure of said rollers, means on said bed for guiding and supporting a chase containing type and form materials, a metallic plate hinged to said bed and means for retaining said plate in position over said chase.

4. A matrix molding machine of the character described comprising a supporting bed, a series of rollers positioned above and below said bed, means for causing longitudinal movement of said bed, said means including a gear carried by one of said rollers and a rack on said bed, means for adjusting the pressure of said rollers, means on said bed for guiding and supporting a chase containing type and form materials, a metallic plate hinged to said bed and means on said plate for retaining a molding blanket and matrix to be molded.

5. A matrix molding machine of the character described comprising a supporting bed, a series of rollers positioned above and below said bed, means for causing longitudinal movement of said bed, said means including a gear carried by one of said rollers and a rack on said bed, means for adjusting the pressure of said rollers, means on said bed for guiding and supporting a chase containing type and form materials, a metallic plate hinged to said bed, means on said plate for retaining a molding blanket and matrix to be molded, said means including a pair of guide strips secured to said plate and in said spaced relation and means for retaining said plate in position over the chase.

6. A matrix molding machine of the character described comprising a supporting bed, a series of rollers positioned above and below said bed, the upper series of rollers rotating freely in journals and adapted to exert a varied downward pressure, means for adjusting the pressure of said rollers, means for causing longitudinal movement of said bed, said means including a gear carried by one of the lower rollers and a rack on said bed, guide means on said bed for supporting a chase containing type and form materials, a metallic plate hinged to said bed, means on said plate for retaining a molding blanket and matrix to be molded, said means including a pair of guide strips secured to said plate and in spaced relation thereon and means for retaining said plate in position over the chase.

7. A matrix molding machine of the character described comprising a supporting bed, means for causing longitudinal movement of said bed, a series of rollers positioned above and below said bed, the upper series of rollers rotating freely in journals and adapted to exert a varied downward pressure, means for adjusting the pressure of said rollers, means on said bed for guiding and supporting a chase containing type and form materials, a metallic plate hinged to said bed and adapted to be positioned over said chase, a fabric sheet supported between said plate and upper series of rollers, and means for retaining said plate over said chase.

8. A matrix molding machine of the character described comprising a supporting bed, a series of rollers positioned above and below said bed, means on said bed for supporting a chase containing type and form materials over which a matrix is adapted to be positioned, and a plate adapted to be positioned over said chase for contact with the upper series of rollers to impart pressure to said matrix.

9. A matrix molding machine of the character described comprising a supporting bed, a series of rollers positioned above and below said bed, the upper series of rollers rotating freely in journals and adapted to exert a varied downward pressure, means for causing longitudinal movement of said bed, means for supporting a chase containing type and form materials over which a matrix is to be positioned, and a metallic plate adapted to be positioned over said chase for contact with the upper series of rollers to impart pressure to said matrix.

10. A matrix molding machine of the character described comprising a supporting bed, means for causing longitudinal movement of said bed, a series of rollers positioned above and below said bed, a pair of spaced guides mounted on said bed for supporting a chase containing type and form materials over which a matrix to be molded is positioned, a plate hinged to said bed and adapted to be positioned over said chase for contact with the upper series of rollers to impart pressure to said matrix and means carried by said guide for retaining said plate in position over the chase.

EDGAR A. MILLS.